July 1, 1958
H. DÖNGES
2,841,172
QUANTITY REGULATOR FOR GAS HEATED CONTINUOUS
FLOW TYPE HOT WATER APPARATUS
Filed March 9, 1954
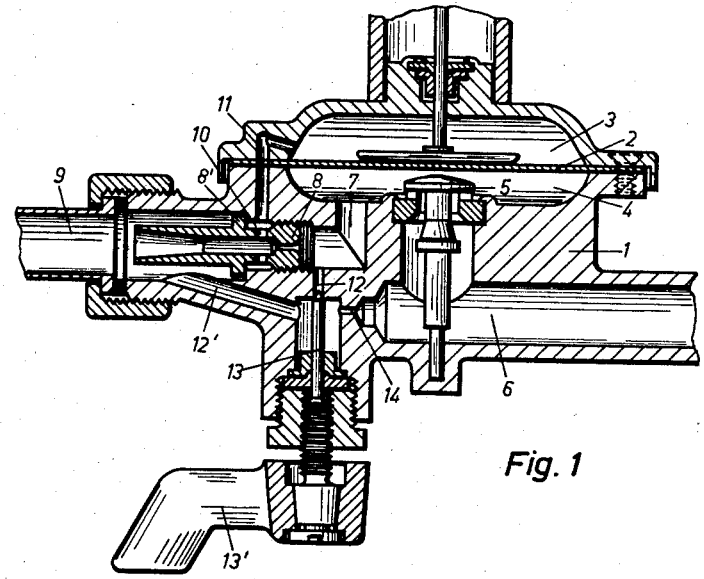
Fig. 1
Fig. 2
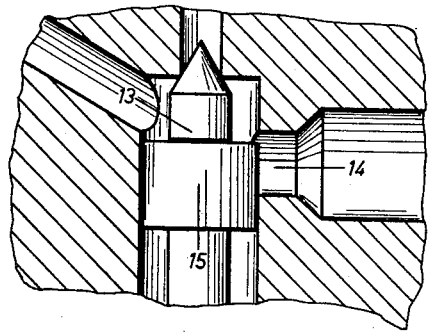
INVENTOR.
BY "United States Patent Office"

2,841,172
Patented July 1, 1958

2,841,172

QUANTITY REGULATOR FOR GAS HEATED CONTINUOUS FLOW TYPE HOT WATER APPARATUS

Hans Dönges, Remscheid, Germany, assignor to Johann Vaillant K. G., Remscheid, Germany Application March 9, 1954, Serial No. 415,049

Claims priority, application Germany March 12, 1953

1 Claim. (Cl. 137—502)

This invention relates to a quantity regulator and preferably to a device for regulating the quantity of water for the use with gas heated continuous flow type hot water apparatus.

In general the regulating valve body of quantity regulating devices is controlled by a differential pressure arising at a throttling cross section when passed through by the medium. The regulating valve being influenced in this manner that a constant predetermined differential pressure is maintained at the throttling point. If for reasons of simplification and lower manufacturing valve a regulating valve is used which has an unbalanced valve body and which closes when the pre-pressure increases, there results a disagreeable deviation of the regulated quantity from the rated quantity. This deviation depends on the pre-pressure and obviously is caused due to dynamic influences exerted by the flowing medium on the valve body of the regulating valve whereby an additional stopping force is effected. The characteristic of a quantity regulator of such type therefore shows a decrease in quantity with increasing pre-pressure.

The invention has for its object in simple manner to compensate for this error of such a quantity regulator.

In particular such a compensation shall be effected with a diaphragm controlled water quantity regulator in which a diaphragm controlling the regulating valve body is exposed on the one hand to the dynamic pressure existing in front of a Venturi tube which is disposed in the water passage and on the other hand to the low pressure produced behind the Venturi tube. In similar manner a compensation can also be provided in gas quantity regulators.

According to the invention the compensation is effected thereby that an auxiliary passage by-passing the regulating valve is connected in parallel to the throttling cross section (Venturi tube). Non-regulated additional fluid being admitted through this auxiliary passage. Such an auxiliary passage can be empirically so dimensioned that the quantity of fluid wanted to form the proper rated quantity is admitted additionally through the auxiliary passage. Since the quantity of fluid admitted through the auxiliary passage is the greater the higher the pre-pressure is, a practically full compensation of the regulating error can be obtained for a determined rated quantity.

For a fuller understanding of the nature and the object of the invention reference should be had to the detailed description in conjunction with the accompanying drawing illustrating an embodiment of the invention.

In the drawings:

Fig. 1 is a schematical representation showing in longitudinal section a quantity regulating device designed according to the invention and Fig. 2 shows in enlarged representation a somewhat different design of the needle valve which is especially suitable for larger rated quantities of fluid.

The diaphragm 2 forming two diaphragm chambers 3, 4 is disposed in the housing 1 of the water quantity regulating device. Through the regulating valve 5 the lower diaphragm chamber 4 is in communication with the pre-pressure space 6 which is connected to the cold water supply.

After having passed the regulating valve 5 the cold water flows through a main passage 7 in which a Venturi tube 8 is located to the cold water supply 9 of the continuous flow type hot water apparatus. The Venturi tube 8 is provided with a collar 8' and forms a closed suction chamber 10 which through the passage 11 is in communication with the upper diaphragm chamber 3. The auxiliary passage 12, 12' by-passing the Venturi tube 8 leads directly from the channel 7 into the cold water supply 9. This auxiliary passage 12, 12' is governed by a needle valve 13 which can be adjusted from the outside by means of a handle 13'. The auxiliary passage 12' by-passing the regulating valve 5 is directly connected to the pre-pressure space 6 through a small auxiliary nozzle 14.

The water pressure in the pre-pressure space 6 lifts the valve body 5 and holds it non-positively in contact with the diaphragm 2. The regulating valve 5 thereby throttles the water flowing into the lower diaphragm chamber 4 so that a constant differential pressure is maintained at the Venturi tube 8. If the needle valve 13 is closed, the regulated quantity of water is determined by the dimension of the Venturi tube 8. Now, it can be arranged that this minimum quantity of water is heated by the apparatus up to a temperature which is close to the boiling point, for instance, to 97 centigrade. A small change in the quantity of water then already results in overheating and undesirable vapor formation. Therefore it is necessary to ensure that in particular in case of the minimum quantity of water the quantity regulator operates accurately. However, errors in regulation occur thereby that by the pre-pressure in space 6, a force which increases with the rising water pressure is exercised on the surface of the valve body 5 and thus acting in the sense of closing. The adjusted quantity of water thus becomes slightly smaller with increasing pre-pressure, and this is a regulating error which, as explained above, especially in case of the minimum water quantity causes disadvantageous results. Through the auxiliary nozzle 14 while by-passing the regulating valve 5 an additional quantity of water is now supplied from the pre-pressure space. This additional quantity of water being the larger the higher the pre-pressure is. With adjusted minimum quantity of water the error caused by the regulator is just compensated by this additional quantity of water.

By opening the needle valve 13 an additional quantity of water is supplied through the auxiliary passage 12, 12' from the space 7 which is disposed behind the regulating valve 5 when viewed in the direction of flow.

The opening of the needle valve 13 results in the same effect as by an enlargement of the Venturi tube 8 would be obtained, such an enlargement, however, cannot be realized without difficulties. In order to be able to maintain the differential pressure at the Venturi tube 8 the regulating valve 5 has to adjust to a larger quantity of water. In consequence of this the error in regulation, as explained above, increases about proportional to the adjusted rated quantity of water, so that this error can no more be compensated by the additional quantity of water supplied by the auxiliary nozzle 14. However, this is often immaterial, since in case of larger rated quantities of water and corresponding low temperatures (approx. 45° C.) small fluctuations amounting to a few degrees are not important. Consequently, the error in regulation can be taken into account more easily in this case.

However, it is also possible to compensate for the error in regulation in case of larger rated quantities of water if, as shown in Fig. 2, a control piston 15 is attached to the valve needle 13. When opening the needle valve 13 the piston 15 enlarges the cross section of the passage of the auxiliary nozzle 14 so that in case of larger rated quantity of water more "compensating additional water" is supplied.

I claim:

In a device for regulating the quantity of a fluid, a housing with a main passage and a smaller auxiliary passage for the fluid, a throttling cross section and a regulation valve with an unbalanced valve body in said main passage, means for controlling said regulating valve in dependence of the differential pressure arising at said throttling cross section, said auxiliary passage by-passing the regulating valve and also the throttling cross section, said housing having a second auxiliary passage, said second auxiliary passage only by-passing the throttling cross section and means to effect a change of the cross section of the two auxiliary passages simultaneously and in same direction.

References Cited in the file of this patent

UNITED STATES PATENTS

| | | |
|---|---|---|
| 375,070 | Jackson | Dec. 20, 1887 |
| 1,199,567 | Kellogg | Sept. 26, 1916 |
| 1,631,109 | Hitzemann | May 31, 1927 |
| 1,715,801 | Turner | June 4, 1929 |
| 1,934,713 | Hughes | Nov. 14, 1933 |